(12) United States Patent
Fuller et al.

(10) Patent No.: US 12,446,479 B1
(45) Date of Patent: Oct. 14, 2025

(54) ELECTROCHEMICAL RANDOM ACCESS MEMORY DEVICE WITH CONTACT LAYER AS A HEAT SOURCE

(71) Applicant: National Technology & Engineering Solutions of Sandia, LLC, Albuquerque, NM (US)

(72) Inventors: Elliot James Fuller, Livermore, CA (US); Albert Alec Talin, Dublin, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 202 days.

(21) Appl. No.: 18/522,640

(22) Filed: Nov. 29, 2023

(51) Int. Cl.
*H10N 70/00* (2023.01)
*G11C 11/54* (2006.01)
*G11C 13/00* (2006.01)
*H10B 63/00* (2023.01)
*H10N 70/20* (2023.01)

(52) U.S. Cl.
CPC ......... *H10N 70/8413* (2023.02); *G11C 11/54* (2013.01); *G11C 13/0011* (2013.01); *G11C 13/0069* (2013.01); *H10B 63/00* (2023.02); *H10N 70/011* (2023.02); *H10N 70/245* (2023.02); *H10N 70/253* (2023.02); *H10N 70/823* (2023.02); *G11C 2013/008* (2013.01)

(58) Field of Classification Search
CPC ............. H10N 70/8413; H10N 70/011; H10N 70/245; H10N 70/253; H10N 70/823; G11C 11/54; G11C 13/0011; G11C 13/0069; G11C 2013/008; H10B 63/00
See application file for complete search history.

(56) References Cited

U.S. PATENT DOCUMENTS

| | | |
|---|---|---|
| 3,990,959 A | 11/1976 | Payne et al. |
| 10,429,343 B1 | 10/2019 | Talin et al. |
| 10,497,866 B1 | 12/2019 | Fuller et al. |
| 11,450,802 B1 | 9/2022 | Li et al. |
| 2002/0037452 A1 | 3/2002 | Schmidt |
| 2009/0303773 A1 | 12/2009 | Rinerson et al. |
| 2020/0328456 A1 | 10/2020 | Asano et al. |
| 2021/0074999 A1 | 3/2021 | Imoto et al. |

(Continued)

OTHER PUBLICATIONS

Haile, et al., "Solid acids as fuel cell electrolytes", In Letters to Nature, vol. 410, Apr. 19, 2021, pp. 910-913.

(Continued)

*Primary Examiner* — Jerome Leboeuf
(74) *Attorney, Agent, or Firm* — Calfee, Halter & Griswold LLP; Gregory M. Doudnikoff; Mario Burgarello

(57) ABSTRACT

Technologies related to an electrochemical random access memory (ECRAM) device are described herein. The ECRAM device includes a channel layer, an electrolyte layer, a reservoir layer, and a conductive contact layer, where the conductive contact layer is in contact with the reservoir layer. A voltage source is coupled to the contact layer and is configured to cause current to flow laterally across the contact layer from one side to another, resulting in the contact layer emitting heat by way of Joule heating. When the ECRAM device is heated to a sufficiently high temperature, a second voltage is applied across the stack of layers, thereby causing ion transport between the reservoir layer and the channel layer.

20 Claims, 7 Drawing Sheets

(56) References Cited

U.S. PATENT DOCUMENTS

| | | | |
|---|---|---|---|
| 2021/0125043 A1* | 4/2021 | Bragaglia | G11C 13/004 |
| 2021/0257409 A1* | 8/2021 | Han | H10N 70/8833 |
| 2023/0165015 A1* | 5/2023 | Rozen | H10N 70/253 |
| | | | 257/421 |

OTHER PUBLICATIONS

Li, et al., "Filament-Free Bulk Resistive Memory Enables Deterministic Analogue Switching", In Advanced Materials, vol. 32, Issue 45, Sep. 22, 2020, 9 Pages.

* cited by examiner

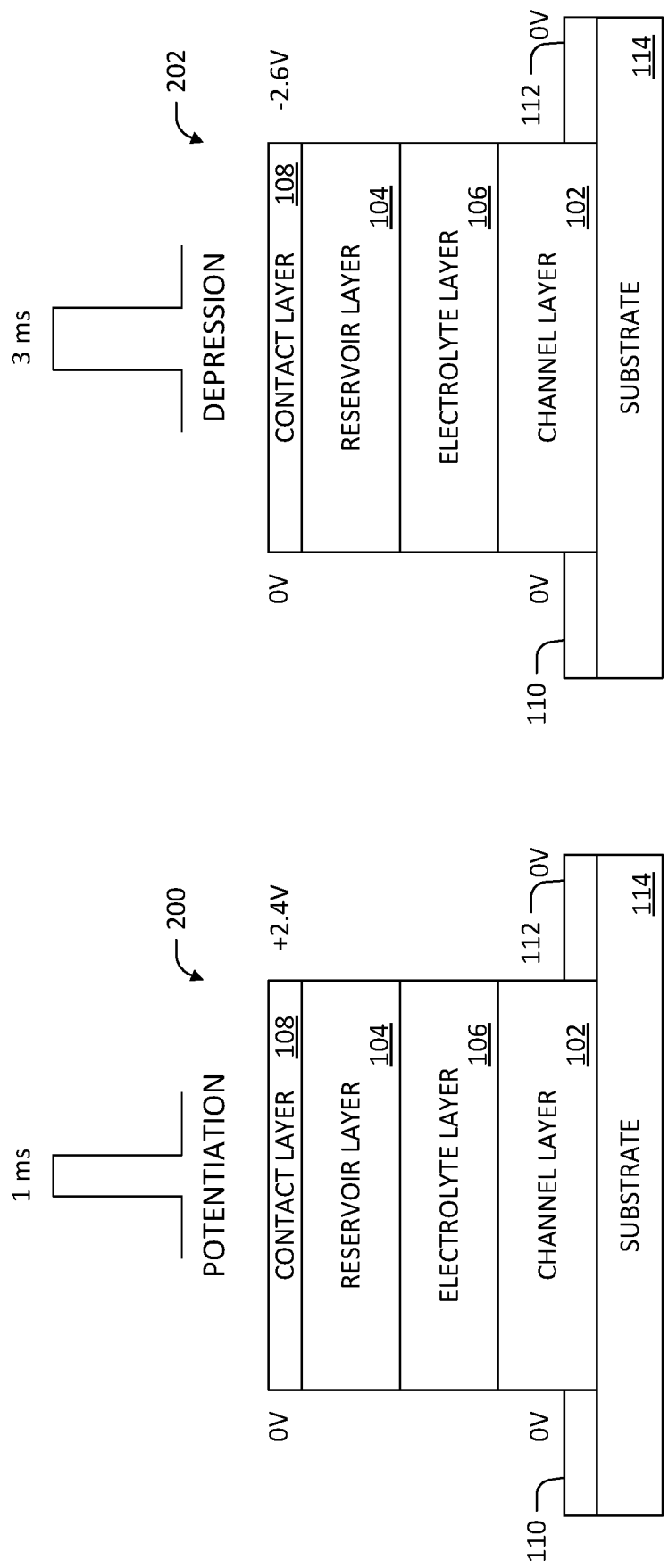

US 12,446,479 B1

ELECTROCHEMICAL RANDOM ACCESS MEMORY DEVICE WITH CONTACT LAYER AS A HEAT SOURCE

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Neuromorphic computing is an emerging area of computing technology that is well-suited to efficiently perform operations associated with artificial neural networks (ANNs). In theoretical neuromorphic computing devices, analog memory elements both process and store weights associated with neurons and/or synapses in an ANN. While software has been developed to emulate the functionality of ANNs using conventional digital computing devices, these conventional computing devices are not designed for efficient execution of ANNs at a hardware level. Thus, conventional digital computing devices are generally inefficient when executing ANNs relative to theoretical performance of a neuromorphic computing device.

Some analog memory devices have been proposed for use in neuromorphic computing devices. For instance, resistive random-access memory (RRAM) and phase change memory (PCM) have been proposed for use in neuromorphic computing devices. RRAM and PCM, however, require large voltages and large currents to program, and additionally exhibit unpredictable and nonlinear behavior when programmed. For example, it is difficult to program an RRAM or PCM memory cell into a desired analog state due to non-uniform heating and electric fields associated with the memory cell. Additionally, RRAM and PCM cells tend to have low channel resistance, drawing micro amperes of current during read operations per cell and precluding scaling into large, energy efficient arrays of memory cells.

Electrochemical random access memory (ECRAM) devices are designed to address deficiencies associated with RRAM and PCM devices, where ECRAM devices exhibit linear behavior during programming. Programming an ECRAM device involves transporting ions from an electrochemical reservoir layer to a channel layer, thereby varying conductance of the channel layer in response to voltage pulses being applied across the reservoir layer, an electrolyte layer, and the channel layer. When the ions to be transported are oxygen vacancies (e.g., when the reservoir layer and the channel layer are formed of a transition metal oxide), the oxygen vacancies are unable to transition between the reservoir layer and the channel layer unless such layers are heated to a relatively high temperature (e.g., between 100° C. and 300° C.). The requirement for heat to facilitate ion transport has caused proposed ECRAM devices to consume a relatively large amount of energy during programming, rendering the ECRAM devices energy inefficient compared to other memory devices. In addition, due to additional circuitry required to heat the ECRAM device, fabrication of the device is complex and causes the device to have suboptimal areal density.

SUMMARY

The following is a brief summary of subject matter that is described in greater detail herein. This summary is not intended to be limiting as to the scope of the claims.

Described herein are various technologies pertaining to ECRAM devices, where the ECRAM devices described herein have higher areal density when compared to previously proposed ECRAM devices, and further where the ECRAM devices described herein do not require separate heating circuitry for each device.

An ECRAM device described herein includes several layers. Specifically, the ECRAM device includes a channel layer that is electrically coupled to a source and a drain, where the source and drain are laterally displaced from one another. The ECRAM device further includes an electrolyte layer that is disposed on the channel layer. The ECRAM device also includes an ionic reservoir layer that is disposed on the electrolyte layer, such that the electrolyte layer is positioned between the channel layer and the ionic reservoir layer. A conductive (e.g., metallic) contact layer is positioned on the ionic reservoir layer, such that the ionic reservoir layer is between the electrolyte layer and the contact layer. In an example, the contact layer comprises at least one of tungsten or platinum.

To program the ECRAM device, the ECRAM device is heated, and ions are transported between the ionic reservoir layer and the channel layer (by way of the electrolyte layer) while the ECRAM device has a relatively high temperature. Rather than using a separate heating circuit to heat the ECRAM device, a first voltage is applied across the contact layer of the ECRAM device, such that electron current travels laterally across the contact layer, thereby heating the contact layer by way of Joule heating. Simultaneously with the contact layer being heated or shortly after the contact layer being heated, a second voltage is applied across the ionic reservoir layer, the electrolyte layer, and the channel layer, causing ionic current to flow between the channel layer and the reservoir layer. Hence, an ion (e.g., an oxygen vacancy) transitions between the channel layer and the reservoir layer.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIGS. 2A-2C illustrate an asymmetric write procedure with respect to an ECRAM device.

DETAILED DESCRIPTION

Figure 1:
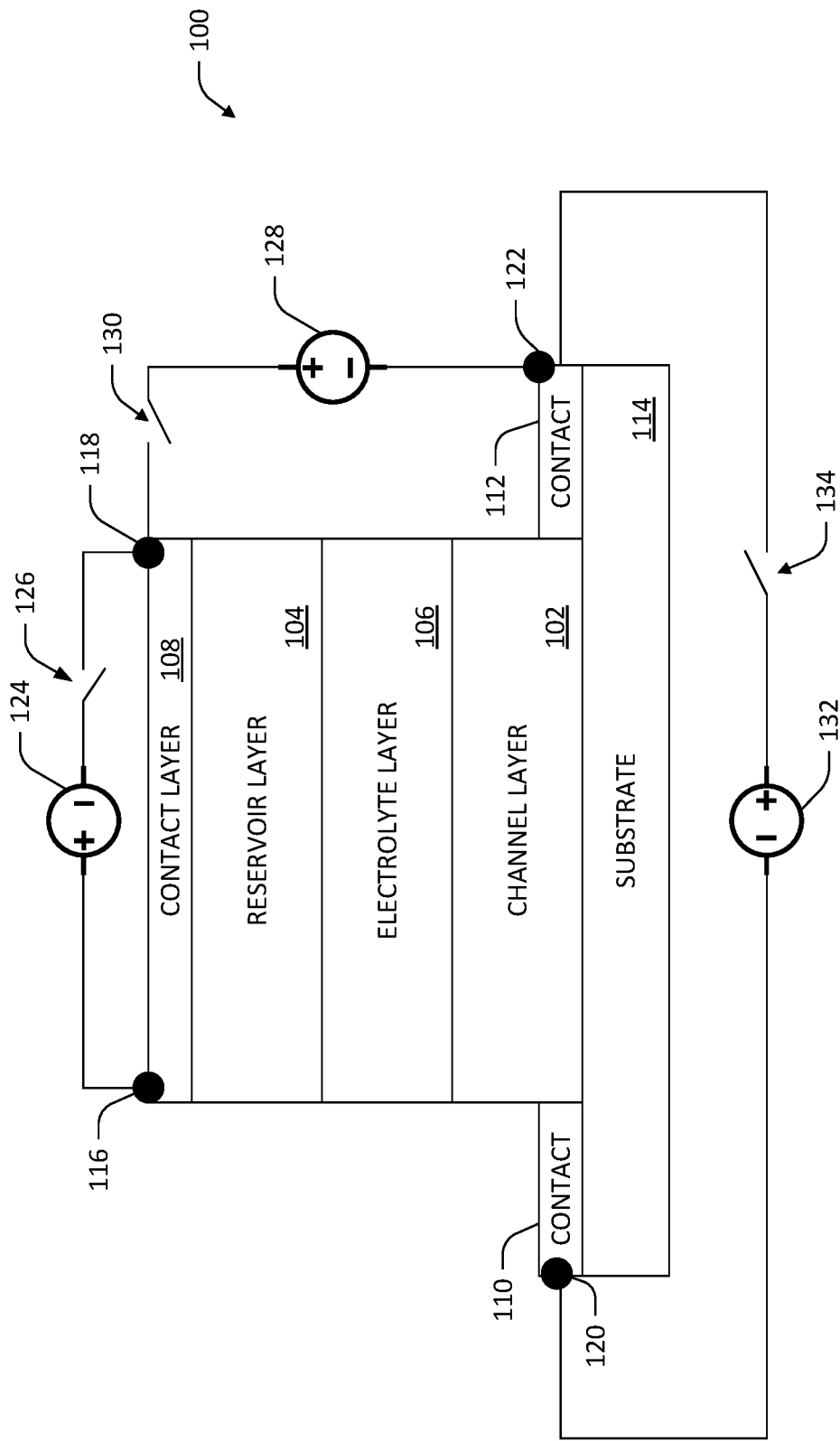
FIG. 1 is a schematic that depicts an electrochemical random access memory (ECRAM) device.

Various technologies pertaining to temperature-sensitive electrochemical random access memory (ECRAM) devices are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various technologies pertaining to an electrochemical random access memory (ECRAM) device are described herein. The ECRAM device described herein exhibits numerous advantages over conventional ECRAM devices, including improved energy efficiency, reduced circuit complexity, and improved areal density relative to other ECRAM devices (and other types of analog memory elements, such as phase change memory (PCM). In the ECRAM device described herein, heat is employed to facilitate ion transport between an ionic reservoir layer to a channel layer (where, in an example, the ion is an oxygen vacancy). In contrast to conventional ECRAM devices, rather than utilizing separate heater circuitry to heat the ECRAM device, voltage is applied across a contact layer that is in direct contact with the reservoir layer, resulting in current laterally traveling across the contact layer, thereby resulting in heat being emitted from the contact layer due to Joule heating. In an example, the contact layer is heated to approximately 300° C. due to the Joule heating, resulting in each layer of the ECRAM device to be correspondingly heated. A lower amount of energy is required to sufficiently heat the layers (the reservoir layer, the electrolyte layer, and the channel layer) of the ECRAM device described herein when compared to other ECRAM devices, due to the heated contact layer being in direct contact with the reservoir layer. Still further, the ECRAM device can be classified as being either a 3-terminal device or a 4-terminal device rather than a 5-terminal device, which is associated with benefits in circuit design and manufacturing.

Referring now to FIG. 1, an ECRAM device 100 is illustrated. The ECRAM device 100 is an analog memory device that can be programmed to have a state (e.g., associated with an analog value) and retain that state. The ECRAM device 100 is particularly well-suited for use in a neuromorphic computing system. Moreover, the ECRAM device 100 can be characterized as being a thermally-sensitive ionic redox transistor. The ECRAM device 100 includes a channel layer 102, an ionic reservoir layer 104, and an electrolyte layer 106 disposed between the channel layer 102 and the reservoir layer 104. In an example, thickness of the channel layer 102 and the reservoir layer 104 can be approximately equivalent; for instance, thickness of the channel layer 102 and the ionic reservoir layer 104 is approximately 50 nm. Thickness of the electrolyte layer 106 can be greater than thicknesses of the channel layer 102 and the reservoir layer 104. Thus, in an example, the thickness of the electrolyte layer 106 is approximately 250 nm.

The ECRAM device 100 also includes a contact layer 108 disposed on the reservoir layer 104, such that the reservoir layer 104 is positioned between the contact layer 108 and the electrolyte layer 106. The ECRAM device 100 also includes contacts 110 and 112 that are laterally positioned on opposing sides of the channel layer 102. The contact layer 108 is a gate contact, the contact 110 is a source contact, and the contact 112 is a drain contact. The ECRAM device 100 can be deposited on a substrate 114, where the substrate can be or include Si, $SiO_2$, or other suitable semiconductor material that is used in a CMOS compatible manufacturing process. Optionally, a dielectric layer can be disposed on the contact layer 108, such that the contact layer 108 is positioned between the dielectric layer and the reservoir layer 104.

The contact layer 108 includes first and second terminals 116 and 118, respectively, that are laterally positioned on opposing sides of the contact layer 108. The contact 110 includes a third terminal 120, and the contact 112 includes a fourth terminal 122. External circuitry is coupled to the contact layers 108-112 at the terminals 116-122. As illustrated, the ECRAM device 100 is a 4-terminal device. As will be described below, however, in other embodiments the ECRAM device 100 can be a 3-terminal device.

A first voltage source 124 is coupled to the terminals 116 and 118 on the contact layer 108, where a switch 126 can be opened and closed such that voltage can be selectively applied across the contact layer 108 between the terminals 116 and 118. Application of voltage by the first voltage source 124 across the contact layer 108 causes (electron) current to flow laterally across the contact layer 108 between the terminals 116 and 118, thus heating the contact layer 108 by way of Joule heating. Magnitude of a voltage pulse and duration of the voltage pulse applied across the contact layer 108 is dependent upon material of the contact layer 108, length, width, and height of the contact layer 108, distance between the terminals 116 and 118, and an amount of heat that is to be created by way of Joule heating.

A second voltage source 128 is coupled to the second terminal 118 of the contact layer 108 and the fourth terminal 122 of the contact 112, where a switch 130 can be opened and closed such that voltage can be selectively applied across the layers 102-106. Alternatively, the second voltage source 128 can be coupled to the first terminal 116 of the contact layer 108 and the third terminal 120 of the contact 110. Application of voltage by the second voltage source 128 across the reservoir layer 104, the electrolyte layer 106, and the channel layer 102 (when such layers are adequately heated) causes ionic current to flow between the reservoir layer 104 and the channel layer 102 (by way of the electrolyte layer), and thus causes transition of ions between the reservoir layer 104 and the channel layer 102. Magnitude of a voltage pulse and duration of the voltage pulse applied across the layers 102-106 is based upon a volume of ions (oxygen vacancies) that are to be transitioned between the reservoir layer 104 and the channel layer 102).

A third voltage source 132 is coupled to the third terminal 120 of the contact 110 and the fourth terminal of the contact 112, where a switch 134 can be opened and closed such that voltage can be selectively applied laterally across the channel layer 102. Application of voltage by the third voltage source 132 laterally across the channel 102 causes (electron) current to flow through the channel layer 102 between the contacts 110 and 112; state of the ECRAM device 100 (when the ECRAM device 100 is cooled) is based upon, for example, conductance of the channel layer 102, which can be determined based upon magnitude of the volage applied by the third voltage source 132 and current measured in the circuit.

As indicated above, conductance of the channel 102 between the contacts 110 and 112 serves as state of the ECRAM device 100 (which is representative of an analog value). As will be described in greater detail herein, the ECRAM device 100 is non-volatile, such that for microscale and nanoscale devices, the conductance state of the channel layer 102 is retained for a relatively long amount of time (e.g., several days) without requiring energy input. Conductance of the channel layer 102 can be varied by write operation and the conductance of the channel layer 102 can be measured by way of a read operation, as will be described in greater detail below. The ECRAM device 100 can further be used as a neuromorphic computing element that applies a weight to a signal input to the ECRAM device 100 based on the conductance state of the channel layer 102, and a current output at one of the contacts 110 or 112 is a product of the conductance of the channel layer 102 and a value of a voltage input to the other of the contacts 110 or 112. Thus, during a read operation, a current output by the ECRAM device 100 can be considered a weighted function of the conductance state of the channel layer 102.

The channel layer 102 can comprise a mixed ionic and electronic conductor (MIEC) material that has an electrical conductance that varies as a function of the bulk concentration of ions (oxygen vacancies) in the channel layer 102. The conductance of the channel layer 102 can be modulated through transport of ions into and out of the channel layer 102. The reservoir layer 104 comprises a MIEC material that is configured to accept ions from or donate ions to the channel layer 102. In an example, the channel layer 102 and the reservoir layer 104 are composed of the same material. For instance, the channel layer 102 and the reservoir layer 104 can include nonstoichiometric titanium dioxide, or $TO_{2\text{-}\delta}$. Besides $TO_{2\text{-}\delta}$, introduction of ion vacancies increases electronic conductivity in many other nonstoichiometric transition metal oxides such as $WO_{3\text{-}\delta}$, $MoO_{3\text{-}\delta}$, and alloys of transition metal oxides. Hence, the channel layer 102 and the reservoir layer 104 can be crystalline layers having several oxygen vacancies formed therein. In yet another example, the channel layer 102 and the reservoir layer 104 include materials based on the fluorite structure such as $CeO_{2\text{-}\delta}$, materials based on the perovskite structure such as $LaMnO_{3\text{-}\delta}$, or amorphous films such as hafnium oxide. In other examples, the channel layer 102 and/or the reservoir layer 104 comprise vanadium dioxide ($VO_2$). For instance, the channel layer 102 and/or the reservoir layer 104 comprise $VO_2$ alloyed with at least one of titanium, aluminum, gallium, or indium. In yet another example, at least one of the channel layer 102 or the reservoir layer 104 comprises niobium dioxide ($NbO_2$). In still yet another example, at least one of the channel layer 102 or the reservoir layer 104 comprises a rare earth perovskite material having a composition of $RiNiO_3$, where R is one of samarium (Sm), praseodymium (Pr), or neodymium (Nd).

Exchange of ions between the channel layer 102 and the reservoir layer 104 occurs by way of the electrolyte layer 106. At least one of the layers 102-106 has an ionic conductivity with respect to ions in the channel layer 102 and the reservoir layer 104 that is at least 100 times greater at elevated temperature (between about 80° C. and about 300° C., between about 100° C. and about 250° C., or between about 125° C. and about 200° C.) than at low temperatures (less than 50° C., between about 0° C. and about 5° C., or between about 10° C. and about 50° C.). At low temperatures, ionic conductivity is sufficiently low in at least one of the layers 102-106 that ions are substantially unable to migrate between the channel layer 102 and the reservoir layer 104. When the ECRAM device 100 is heated to an elevated temperature, each of the layers 102-106 has sufficiently high ionic conductivity with respect to ions present in the channel layer 102 and the reservoir layer 104 to allow the ions to migrate between the channel layer 102 and the reservoir layer 104. By way of example, the electrolyte layer 106 can comprise yttria-stabilized zirconia (YSZ) when the channel layer 102 and the reservoir layer 104 are composed of materials that include mobile oxygen vacancies. In other examples, the electrolyte layer can comprise $CeO_2$ or $SrTiO_3$. For some materials, such as YSZ, temperature-varying ionic conductivity results from increased ion vacancy mobility at higher temperatures. For other materials, temperature-varying ionic conductivity may result from increased vacancy concentration in the electrolyte layer 106 at higher temperatures. In a nonlimiting example, the electrolyte layer 106 comprises strontium titanate ($SrTiO_3$).

A write procedure to modify the conductance state of the channel layer 102 of the ECRAM device 100 is now described. Write performance of the ECRAM device 100 is substantially linear and symmetric, yielding predictable change of conductance state of the channel layer 102 without a priori knowledge of the present conductance state of the channel layer 102. As noted above, the conductance of the channel layer 102 can be varied by control of transport of ions between the channel layer 102 and the reservoir layer 104. Migration of ions between the channel layer 102 and the reservoir layer 104 across the electrolyte layer 106 occurs in response to application of voltage by the second voltage source 128 across the channel layer 102 and the reservoir layer 104 when the ECRAM device 100 is sufficiently heated. By way of example, a voltage $V_{write}$ applied between the contact layer 108 and the contact 112 causes an ionic current to flow between the channel layer 102 and the reservoir layer 104 by way of the electrolyte layer 106.

Migration of ions across the electrolyte layer 106, however, is limited by the ionic conductivity of the layers 102-106. With respect to ions present in the channel layer 102 and the reservoir layer 104, at low temperatures, at least one of the layers 102-106 is substantially non-conductive (e.g., at least 100 times less conductive than when the ECRAM device 100 is heated to the temperature of the write procedure) to ions present in the channel layer 102 and the reservoir layer 104 that are responsible for the electronic conductance of the channel layer 102. Accordingly, at low temperatures, application of voltage pulses at $V_{write}$ will not cause sufficient ion migration between the channel layer 102 and the reservoir layer 104 to substantially change the conductance state of the channel layer 102. Put differently, at low temperatures, the conductance state of the channel layer 102 is substantially invariant in response to voltage pulses at $V_{write}$. The conductance state will not degrade when the switch 130 is leaky (e.g., when the switch 130 permits electrical current to flow even when the switch 130 is open), or even when the switch 126 does not exist and there exists a direct electrical path from the reservoir layer 104 to the channel layer 102, because ion migration from the channel layer 102 to the reservoir layer 104 is effectively blocked when the ECRAM device 100 is at low temperatures.

During a write operation, a change in conductance of the channel layer 102 exhibits a linear dependence on the number of ions and the electrons that accompany these ions (such that the channel layer 102 maintains its electroneutrality) that migrate into or out of the channel layer 102. A number of ions that migrate into or out of the channel layer 102 responsive to a voltage pulse applied by the second voltage source 128 depends upon a magnitude and duration of the voltage pulse, but also exhibits a linear relationship. Thus, two voltage pulses of equal magnitude and duration caused substantially the same change in conductance of the channel layer 102. Furthermore, pulses of equal duration and equal but opposite magnitude caused substantially equal but opposite changes in the conductance of the channel layer 102.

As referenced above, the ECRAM device 100 is sensitive to temperature, in that the write operation is unable to be performed unless the ECRAM device 100 is heated to some suitably high temperature. Prior to or during a write operation, the first voltage source 124 applies a voltage $V_{heat}$ across the contact layer 108 between the terminals 116 and 118, thereby causing electrons to flow laterally through the contact layer 108 between the terminals 116 and 118. The current flowing laterally through the contact layer 108 causes the contact layer 108 to emit heat by way of Joule. Heat emitted from the contact layer 108 heats the reservoir layer 104, the electrolyte layer 106, and the channel layer 102, such that when the second voltage source 128 applies a write voltage across the layers 102-106, ions can flow between the channel layer 102 and the reservoir layer 104 by way of the electrolyte layer 106. Subsequent to the write operation being performed, the switches 126 and 130 are opened, such that voltage is no longer applied across the contact layer 108 or across the layers 102-106. The ECRAM device 100 will cool to room temperature, causing the conductance state of the channel layer 102 to remain static.

A read operation is now described. Subsequent to the write operation, the conductance state of the channel layer 102 can be read based upon the third voltage source 132 applying a voltage $V_{read}$ laterally across the channel layer 102, and then measuring a current I that flows between the contacts 110 and 112. The conductance of the channel layer 102 can be computed through application of Ohm's law, where conductance G of the channel layer 102 is equal to $I/V_{read}$. Resistance of the channel layer 102 between the contacts 110 and 112 on the order of 10s to hundreds of MΩ was observed in experimental measurements of microscale and nanoscale embodiments of the ECRAM device 100. Hence, the ECRAM device 100 can include or be coupled to readout circuitry, where the readout circuitry is coupled to at least one of the terminals 120 or 122, and further where the readout circuitry is configured to readout a state of the channel layer 102.

Thermally-sensitive ECRAM devices constructed in accordance with the disclosure set forth herein have been shown to retain state for extended period of time (e.g., several days) at room temperature. For instance, experimental data indicates that conductance state of the channel layer 102 of the ECRAM device 100 decays more slowly at low or temperatures. For instance, an ECRAM device was shown to experience less than 2% degradation in conductance of the channel layer 102 after 10 days at a temperature of less than 50° C. (e.g., approximately 25° C.). Thus, the thermally-sensitive ECRAM device 100 described herein exhibits substantially improved state retention performance as compared to other analog memory devices, which exhibit state loss after only several seconds in microscale and nanoscale devices. Moreover, heating of the ECRAM device 100 by way of Joule at the contact layer 108 is more energy efficient when compared to previous approaches for heating ECRAM devices, which require separate heating circuitry.

As referenced above, in other embodiments the ECRAM device 100 can be configured as a 3-terminal device. More specifically, the ECRAM device 100 can be programmed using a single heater terminal held at voltage; thus, rather than the ECRAM device 100 including both terminals 116 and 118, the ECRAM device 100 can include one of such terminals 116 or 118 (positioned at any suitable location on the contact layer 108). Thus, the source contact 110 or the drain contact 112 can be electrically coupled to one of the terminals 116 and 118, thereby allowing the device to operate as a 3-terminal device.

Figure 2C:
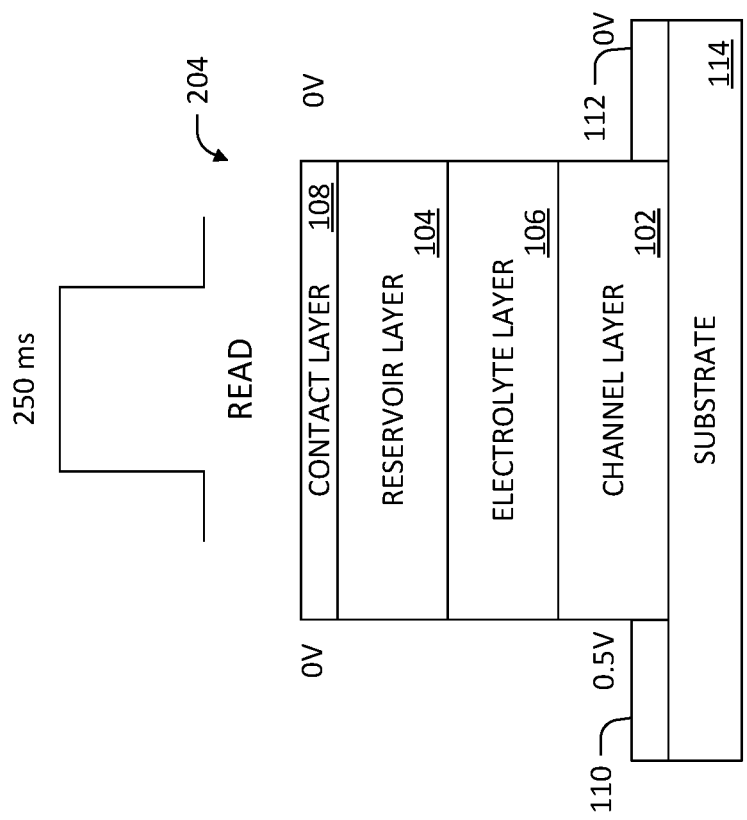

The ECRAM device 100, in the 3-terminal embodiment, can be programmed by way of an "asymmetric write" programming scheme. For instance, referring to FIGS. 2A-2C, the asymmetric write scheme is depicted, where steps of potentiation 200, depression 202, and read 204 are depicted.

Figure 3:
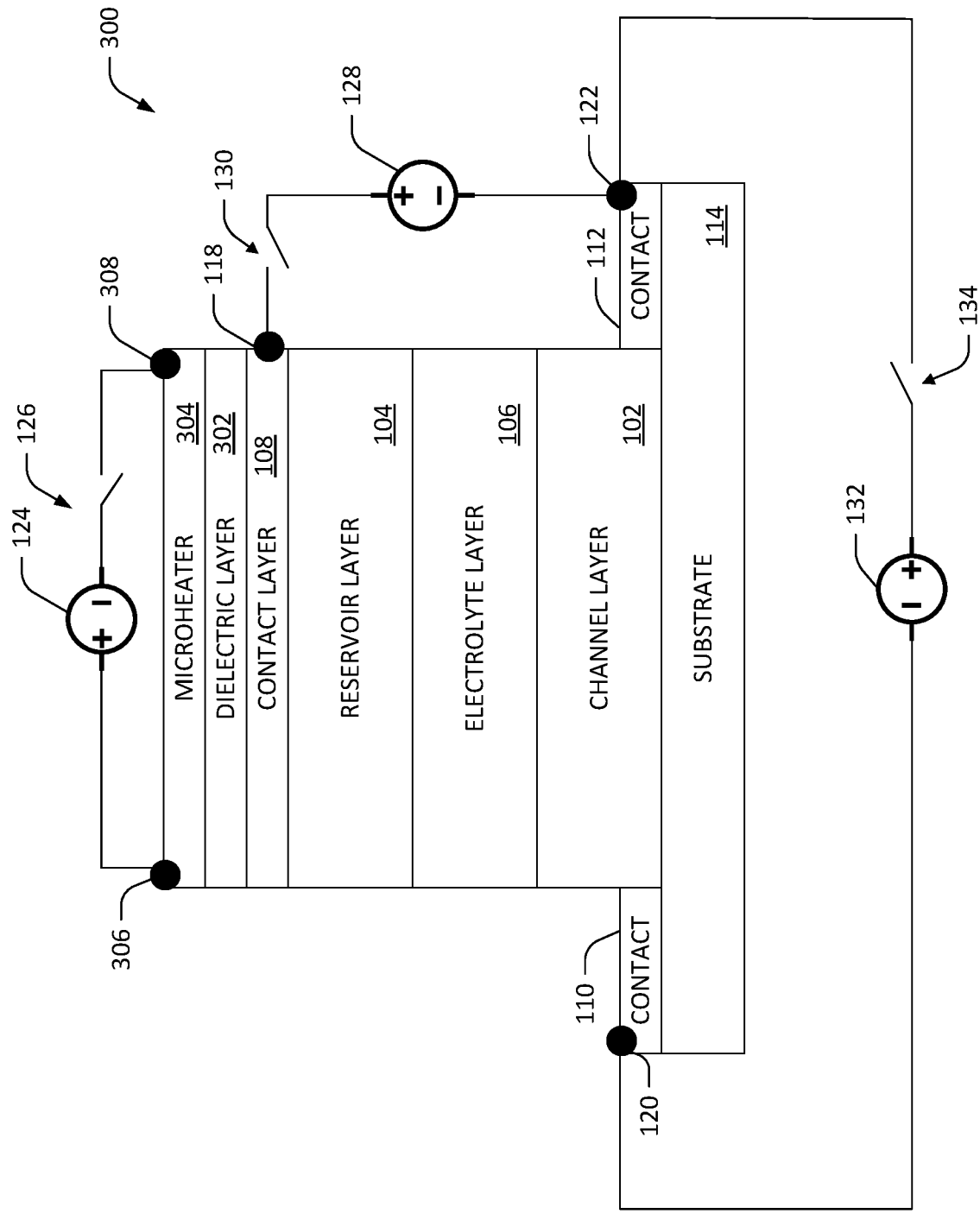
FIGS. 3-5 are schematics that depict other ECRAM devices.

Referring to FIG. 3, an ECRAM device 300 that is heated by way of physically separated and dedicated heating circuitry is presented. The ECRAM device 300 includes the terminals 118, 120, and 122 on the contact layer 108, the source contact 110, and the drain contact 112, respectively. The ECRAM device 300 includes a dielectric layer 302 disposed on the contact layer 108, such that the contact layer 108 is between the reservoir layer 104 and the dielectric layer 302. A microheater 304 is disposed on the dielectric layer 302, such that the dielectric layer 302 is between the microheater 304 and the contact layer 108. The microheater 304 has terminals 306 and 308 associated therewith, where the first voltage source 124 is electrically coupled to the microheater 304 by way of the terminals 306 and 308. Thus, in contrast with the ECRAM device 100 illustrated in FIG. 1, the ECRAM device 300 can be classified as a 5-terminal device.

In the ECRAM device 300 illustrated in FIG. 3, the first voltage source 124 applies voltage pulses to the microheater 304, which emits heat. The heat travels through the dielectric layer 302 and the contact layer 108, finally heating the reservoir layer 104, the electrolyte layer 106, and the channel layer 102. Because the microheater 304 is displaced from the layers 102-106 and separated therefrom by the dielectric layer 302 and the contact layer 108, heat is not efficiently used, and a relatively large amount of energy is needed to heat the layers 102-106 to a temperature that is suitable for performing the write procedure described above. In addition, inclusion of the microheater 304 in the ECRAM device 300 increases circuit complexity of the ECRAM device 300 when compared to the ECRAM device 100 illustrated in FIG. 1. Moreover, it can be ascertained that the microheater 304 and the dielectric layer 302 result in the ECRAM device 300 having lower areal density when compared to the areal density of the ECRAM device 100. Decreased areal density of the CRM device 300 relative to the CRM device 100 is shown, as the ECRAM device 100 can store the same amount of information as the ECRAM device 300 while using less space.

Figure 4:
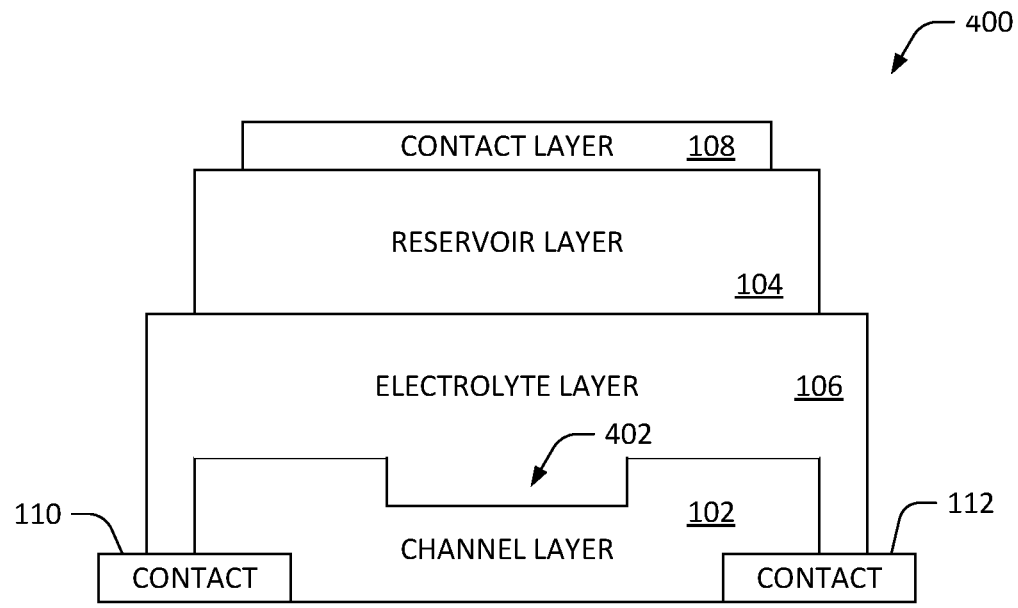
Figure 5:
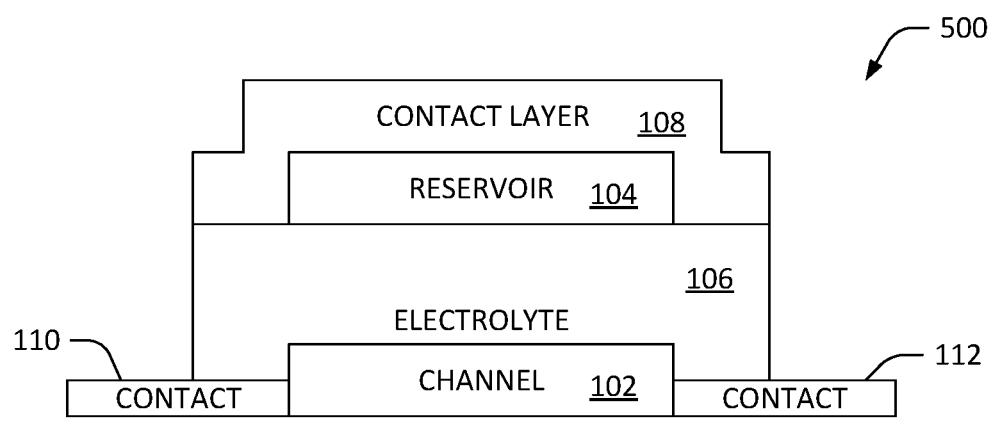

FIGS. 4 and 5 depict other example designs of ECRAM devices. FIG. 4 is a schematic that depicts a cross sectional view of an ECRAM device 400. In the example depicted in FIG. 4, the contact layer 108 does not extend laterally across an entirety of the reservoir layer 104. Further, the reservoir layer 104 does not extend laterally across an entirety of the electrolyte layer 106. Lateral boundaries of the electrolyte layer 106 extend beyond the lateral boundaries of the channel layer 102. In addition, the channel layer 102 includes an indent 402 that is positioned laterally at approximately the center of the contact layer 108, the reservoir layer 104, the electrolyte layer 106, and the channel layer 102.

FIG. 5 is a cross sectional view of another ECRAM device 500. In this example, the contact layer 108 extends laterally beyond the reservoir layer 104, such that the contact layer 108 partially surrounds the reservoir layer 104. The "lower" boundary of the reservoir layer 104 is bounded by the electrolyte layer 106, which extends laterally beyond the lateral boundaries of the channel layer 102. In the example shown in FIG. 5, lateral boundaries of the channel layer 102 are substantially aligned with lateral boundaries of the reservoir layer 104. Moreover, the electrolyte layer 106 is in partial contact with the contacts 110 and 112. While FIGS. 4 and 5 depict a few example implementations of an ECRAM device, it is understood that various other implementations (with the layers having different shapes) are contemplated.

Figure 6:
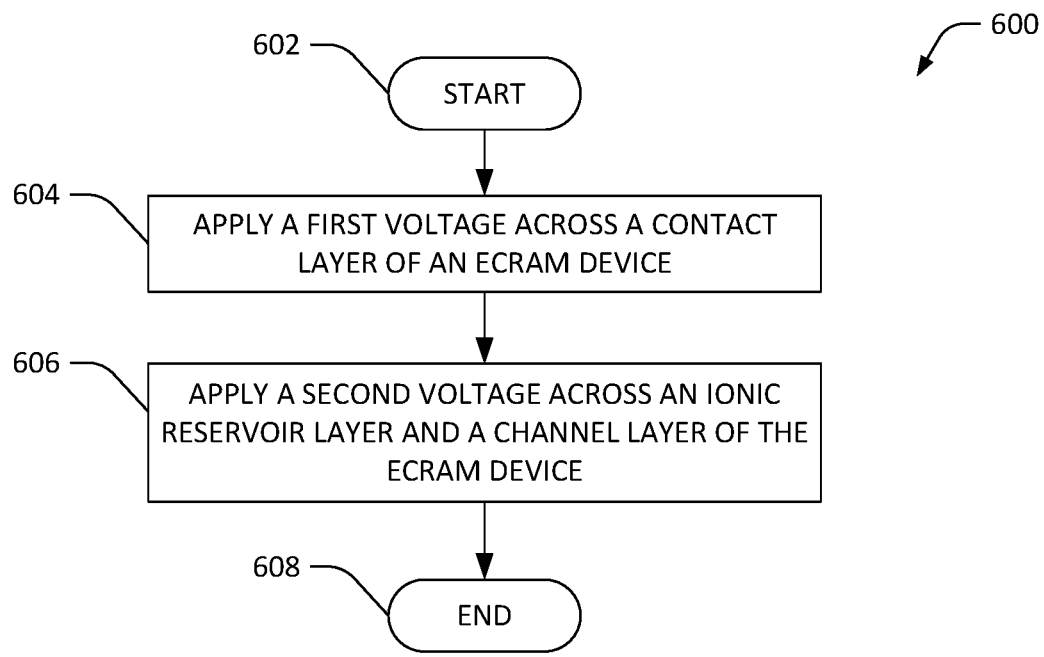
FIG. 6 is a flow diagram that illustrates a method for programming an ECRAM device.
Figure 7:
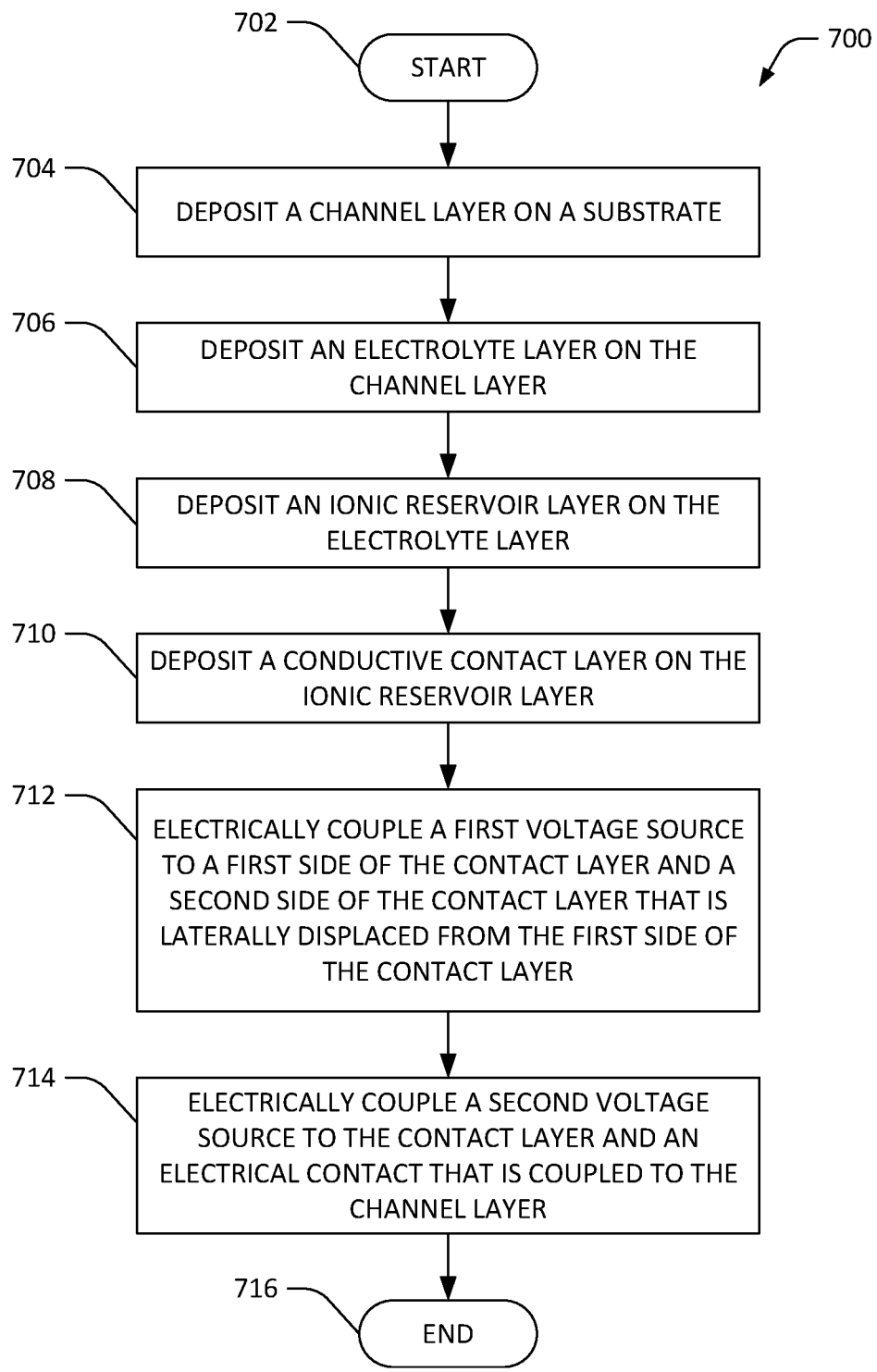
FIG. 7 is a flow diagram that illustrates a method for forming an ECRAM device.

FIGS. 6 and 7 illustrate methodologies relating to use and formation of ECRAM devices, respectively. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Referring now solely to FIG. 6, a method 600 for programming an ECRAM device is illustrated (such as the ECRAM device 600 depicted in FIG. 1). The method 600 starts at 602, and a 604 a first voltage is applied across a contact layer of the ECRAM device, such that current travels laterally across the contact layer. This lateral movement of the current across the contact layer causes the contact layer of the ECRAM device to emit heat by way of Joule heating. As described above, the contact layer is in direct contact with an ionic reservoir layer of the ECRAM device.

At 606, a second voltage is applied across the ionic reservoir layer and a channel layer of the ECRAM device, thereby causing ionic current to flow between the reservoir layer and the channel layer of the ECRAM device. Hence, in an example, an ion travels from the ionic reservoir layer to the channel layer through an electrolyte layer, where the electrolyte layer is positioned between the ionic reservoir layer and the channel layer, and further where the ECRAM device is programmed based upon the ion being placed in the channel layer. As described above, the ion can be an oxygen vacancy.

Programming multiple ECRAM devices in parallel can involve applying heating voltage to contact layers of several ECRAM devices in parallel, while applying write voltages serially. In other examples, both heating and write voltages can be applied serially to each of several ECRAM devices that are included in an array. The method 600 completes at 608.

With reference now to FIG. 7, a method 700 for forming an ECRAM device (such as the ECRAM device 100 of FIG. 1) is illustrated. The method 700 starts at 702, and at 704 a channel layer is deposited on a substrate. At 706, an electrolyte layer is deposited on the channel layer, such that the channel layer is positioned between the substrate and the electrolyte layer. At 708, an ionic reservoir layer is deposited on the electrolyte layer, such that the electrolyte layer is positioned between the channel layer and the ionic reservoir layer. At 710, a conductive (e.g., metallic) contact layer is deposited on the ionic reservoir layer, such that the ionic reservoir layer is positioned between the electrolyte layer and the conductive contact layer.

At 712, a first voltage source is electrically coupled to a first side of the contact layer and a second side of the contact layer, where the first voltage source is configured to apply a first voltage across the contact layer between the first side and the second side thereby heating the contact layer by way of Joule heating. At 714, a second voltage source is electrically coupled to the contact layer and an electrical contact that is coupled to the channel layer, where the second voltage source is configured to apply a second voltage across the ionic reservoir layer, the electrolyte layer, and the channel layer to facilitate transition of an oxygen vacancy from the ionic reservoir layer to the channel layer. The method 700 completes at 716.

Various technologies have been described herein in accordance with at least the following examples.

(A1) In an aspect, a method for programming an ECRAM device is disclosed herein, where the method includes applying a first voltage across a contact layer of the ECRAM device, thereby causing the contact layer of the ECRAM to emit heat, where the contact layer is in contact with an ionic reservoir layer of the ECRAM device. The method also includes applying a second voltage across the ionic reservoir layer and a channel layer of the ECRAM device, thereby causing an ion to travel from the ionic reservoir layer to the channel layer through an electrolyte layer, where the electrolyte layer is positioned between the ionic reservoir layer and the channel layer, where the ECRAM is programmed based upon the ion being placed in the channel layer.

(A2) In some embodiments of the method of (A1), the first voltage is applied prior to the second voltage.

(A3) In some embodiments of the method of (A1), the first voltage is applied simultaneously with the second voltage.

(A4) In some embodiments of the method of at least one of (A1)-(A3), the ion is an oxygen vacancy.

(A5) In some embodiments of the method of at least one of (A1)-(A4), the ionic reservoir layer and the channel layer are formed of a transition metal oxide.

(B1) In another aspect, an ECRAM device is programmed by way of at least one of the methods of (A1)-(A5).

(C1) In yet another aspect, a method for creating an ECRAM device includes depositing a channel layer on a substrate. The method also includes depositing an electrolyte layer on the channel layer, such that the channel layer is positioned between the substrate and the electrolyte layer. The method further includes depositing an ionic reservoir layer on the electrolyte layer, such that the electrolyte layer is positioned between the channel layer and the ionic reservoir layer. The method additionally includes depositing a conductive contact layer on the ionic reservoir layer, such that the ionic reservoir layer is positioned between the electrolyte layer and the conductive contact layer. The method also includes forming an electrical contact that is coupled to the channel layer. The method further includes electrically coupling a first voltage source to a first side of the contact layer and a second side of the contact layer, where the first voltage source is configured to apply a first voltage laterally across the contact layer between the first side and the second side thereby causing the contact layer to emit heat. The method additionally includes electrically coupling a second voltage source to the contact layer and the electrical contact that is coupled to the channel layer, where the second voltage source is configured to apply a second voltage across the ionic reservoir layer, the electrolyte layer, and the channel layer to facilitate transition of an oxygen vacancy from the ionic reservoir layer to the channel layer.

(D1) In another aspect, an ECRAM device is disclosed, where the ECRAM device is formed by way of the method of (C1).
(E1) In yet another aspect, a system disclosed herein includes an ECRAM device, where the ECRAM device includes an ionic reservoir layer that comprises an oxygen vacancy. The ECRAM device also includes an electrolyte layer in contact with the ionic reservoir layer. The ECRAM device further includes channel layer in contact with the electrolyte layer such that the electrolyte layer is positioned between the ionic reservoir layer and the channel layer. The ECRAM device additionally includes a contact layer in contact with the ionic reservoir layer such that the ionic reservoir layer is positioned between the contact layer and the electrolyte layer. The system also includes a first voltage source in electrical contact with the contact layer, where the first voltage source is configured to apply a first voltage across the contact layer such that current travels laterally across the contact layer and the contact layer emits heat by way of Joule heating. The system further includes a second voltage source in electrical contact with the contact layer and a contact that is coupled to the channel layer. The second voltage source is configured to apply a second voltage across the ionic reservoir layer, the electrolyte layer, and the channel layer. The heat emitted by the contact layer facilitates transition of the oxygen vacancy from the ionic reservoir layer to the channel layer by way of the electrolyte layer when the second voltage is applied across the ionic reservoir layer, the electrolyte layer, and the channel layer.
(E2) In some embodiments of the system of (E1), the contact layer is at least partially formed of tungsten.
(E3) In some embodiments of the system of at least one of (E1)-(E2), the contact is a drain contract of the ECRAM. The ECRAM further includes a source contact coupled to the channel layer, where the contact layer comprises a first terminal and a second terminal, where ionic current flows between the first terminal and the drain contact by way of the ionic reservoir layer, the electrolyte layer, and the channel layer based upon the second voltage applied across the ionic reservoir layer, the electrolyte layer, and the channel layer, and further where the current travels between the first contact terminal and the second contact terminal based upon the first voltage applied across the contact layer.
(E4) In some embodiments of the system of (E3), the system also includes readout circuitry that is coupled to at least one of the source contact or the drain contact, where the readout circuitry is configured to readout a state of the channel layer.
(E5) In some embodiments of the system of at least one of (E1)-(E4), the system also includes a dielectric layer placed in contact with the contact layer such that the contact layer is between the dielectric layer and the ionic reservoir layer.
(E6) In some embodiments of the system of at least one of (E1)-(E5), the channel layer comprises vanadium dioxide ($VO_2$).
(E7) In some embodiments of the system of (E6), the channel layer includes $VO_2$ alloyed with at least one of titanium, aluminum, gallium, or indium.
(E8) In some embodiments of the system of at least one of (E1)-(E7), the channel layer comprises niobium dioxide ($NbO_2$).
(E9) In some embodiments of the system of at least one of (E1)-(E8), the channel layer comprises a rare earth perovskite material having a composition of $RiNiO_3$, where R is one of samarium (Sm), praseodymium (Pr), or neodymium (Nd).
(E10) In some embodiments of the system of at least one of (E1)-(E9), the ionic reservoir layer and the channel layer are formed of a transition metal oxide.
(E11) In some embodiments of the system of at least one of (E1)-(E10), a conductance of the channel layer is indicative of a weight that is applied to a node or synapse of an artificial neural network (ANN), and further where the system is configured to output a value based upon the conductance of the channel.
(E12) In some embodiments of the system of at least one of (E1)-(E11), the contact layer includes platinum.
(E13) In some embodiments of the system of at least one of (E1)-(E12), the first voltage source applies the first voltage across the contact layer simultaneously with the second voltage source applying the second voltage across the ionic reservoir layer, the electrolyte layer, and the channel layer.
(E14) In some embodiments of the system of at least one of (E1)-(E12), the first voltage source applies the first voltage across the contact layer prior to the second voltage source applying the second voltage across the ionic reservoir layer, the electrolyte layer, and the channel layer.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
an electrochemical random access memory (ECRAM) device comprising:
an ionic reservoir layer that comprises an oxygen vacancy;
an electrolyte layer in contact with the ionic reservoir layer;
a channel layer in contact with the electrolyte layer such that the electrolyte layer is positioned between the ionic reservoir layer and the channel layer; and
a contact layer in contact with the ionic reservoir layer such that the ionic reservoir layer is positioned between the contact layer and the electrolyte layer;
a first voltage source in electrical contact with the contact layer, where the first voltage source is configured to apply a first voltage across the contact layer such that current travels laterally across the contact layer and the contact layer emits heat by way of Joule heating; and
a second voltage source in electrical contact with the contact layer and a contact that is coupled to the channel layer, where the second voltage source is configured to apply a second voltage across the ionic reservoir layer, the electrolyte layer, and the channel layer, and further where the heat emitted by the contact layer facilitates transition of the oxygen vacancy from the ionic reservoir layer to the channel layer by way of the electrolyte layer when the second voltage is applied across the ionic reservoir layer, the electrolyte layer, and the channel layer.

2. The system of claim 1, wherein the contact layer is at least partially formed of tungsten.

3. The system of claim 1, where the contact is a drain contact of the ECRAM, the ECRAM device further comprises:

a source contact coupled to the channel layer, where the contact layer comprises a first terminal and a second terminal, where ionic current flows between the first terminal and the drain contact by way of the ionic reservoir layer, the electrolyte layer, and the channel layer based upon the second voltage applied across the ionic reservoir layer, the electrolyte layer, and the channel layer, and further where the current travels between the first contact terminal and the second contact terminal based upon the first voltage applied across the contact layer.

4. The system of claim 3, further comprising readout circuitry that is coupled to at least one of the source contact or the drain contact, where the readout circuitry is configured to readout a state of the channel layer.

5. The system of claim 1, further comprising a dielectric layer placed in contact with the contact layer such that the contact layer is between the dielectric layer and the ionic reservoir layer.

6. The system of claim 1, where the channel layer comprises vanadium dioxide ($VO_2$).

7. The system of claim 6, where the channel layer comprises $VO_2$ alloyed with at least one of titanium, aluminum, gallium, or indium.

8. The system of claim 1, where the channel layer comprises niobium dioxide ($NbO_2$).

9. The system of claim 1, where the channel layer comprises a rare earth perovskite material having a composition of $RiNiO_3$, where R is one of samarium (Sm), praseodymium (Pr), or neodymium (Nd).

10. The system of claim 1, where the ionic reservoir layer and the channel layer are formed of a transition metal oxide.

11. The system of claim 1, where a conductance of the channel layer is indicative of a weight that is applied to a node or synapse of an artificial neural network (ANN), and further where the system is configured to output a value based upon the conductance of the channel.

12. The system of claim 1, where the contact layer comprises platinum.

13. The system of claim 1, where the first voltage source applies the first voltage across the contact layer simultaneously with the second voltage source applying the second voltage across the ionic reservoir layer, the electrolyte layer, and the channel layer.

14. The system of claim 1, where the first voltage source applies the first voltage across the contact layer prior to the second voltage source applying the second voltage across the ionic reservoir layer, the electrolyte layer, and the channel layer.

15. A method for programming an electrochemical random access memory (ECRAM) device, the method comprising:

applying a first voltage across a contact layer of the ECRAM device, thereby causing the contact layer of the ECRAM to emit heat, where the contact layer is in contact with an ionic reservoir layer of the ECRAM device; and applying a second voltage across the ionic reservoir layer and a channel layer of the ECRAM device, thereby causing an ion to travel from the ionic reservoir layer to the channel layer through an electrolyte layer, where the electrolyte layer is positioned between the ionic reservoir layer and the channel layer, where the ECRAM is programmed based upon the ion being placed in the channel layer.

16. The method of claim 15, where the first voltage is applied prior to the second voltage.

17. The method of claim 15, where the first voltage is applied simultaneously with the second voltage.

18. The method of claim 15, where the ion is an oxygen vacancy.

19. The method of claim 15, where the ionic reservoir layer and the channel layer are formed of a transition metal oxide.

20. A method for creating an electrochemical random access memory (ECRAM) device, the method comprising:

depositing a channel layer on a substrate;

depositing an electrolyte layer on the channel layer, such that the channel layer is positioned between the substrate and the electrolyte layer;

depositing an ionic reservoir layer on the electrolyte layer, such that the electrolyte layer is positioned between the channel layer and the ionic reservoir layer;

depositing a conductive contact layer on the ionic reservoir layer, such that the ionic reservoir layer is positioned between the electrolyte layer and the conductive contact layer;

forming an electrical contact that is coupled to the channel layer;

electrically coupling a first voltage source to a first side of the contact layer and a second side of the contact layer, where the first voltage source is configured to apply a first voltage laterally across the contact layer between the first side and the second side thereby causing the contact layer to emit heat; and electrically coupling a second voltage source to the contact layer and the electrical contact that is coupled to the channel layer, where the second voltage source is configured to apply a second voltage across the ionic reservoir layer, the electrolyte layer, and the channel layer to facilitate transition of an oxygen vacancy from the ionic reservoir layer to the channel layer.

* * * * *